Figure 1:
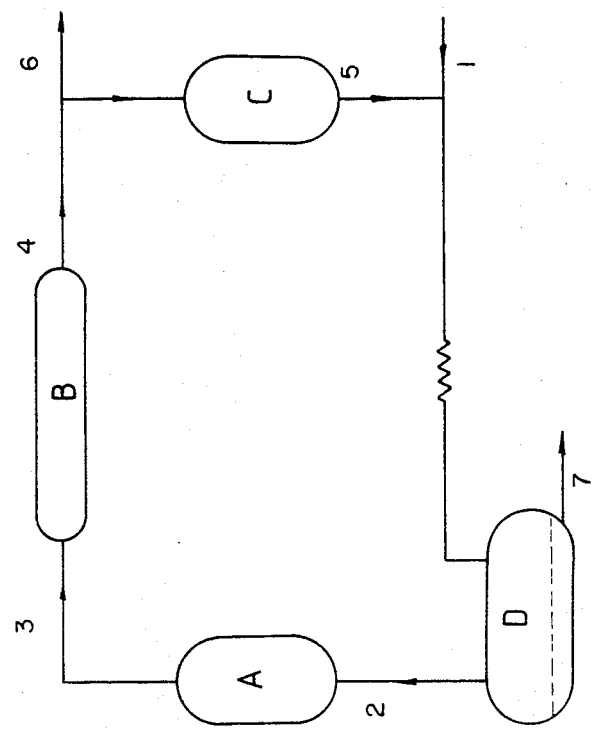

United States Patent [19]

Lavie

[11] Patent Number: 4,537,760
[45] Date of Patent: Aug. 27, 1985

[54] PROCESS FOR THE MANUFACTURE OF AMMONIA

[75] Inventor: Ram Lavie, Haifa, Israel

[73] Assignee: Technion Research and Development Foundation, Inc., Haifa, Israel

[21] Appl. No.: 640,858

[22] Filed: Aug. 14, 1984

Related U.S. Application Data

[63] Continuation-in-part of Ser. No. 403,137, Jul. 29, 1982, abandoned.

[30] Foreign Application Priority Data

Aug. 21, 1981 [IL] Israel .......................................... 63630

[51] Int. Cl.$^3$ ................................................ C01C 1/04
[52] U.S. Cl. ........................................ 423/359; 55/70
[58] Field of Search .................. 423/359, 360, 361; 55/70

[56] References Cited

U.S. PATENT DOCUMENTS 1,319,663 10/1919 Davis et al. ............................... 55/70
3,343,916 9/1967 Cahn et al. ............................ 423/359
3,702,525 11/1972 Simonet et al. ........................... 55/70

FOREIGN PATENT DOCUMENTS 2106486 4/1983 United Kingdom .

Primary Examiner—John Doll
Assistant Examiner—Wayne A. Langel
Attorney, Agent, or Firm—Browdy and Neimark

[57] ABSTRACT

The present invention relates to an improved process for the manufacture of ammonia from a gaseous mixture containing hydrogen and nitrogen. According to the invention, the process comprises the steps of: (a) feeding a gaseous mixture of hydrogen and nitrogen, in the proportions of about 3 moles hydrogen to 1 mole nitrogen, together with inert gases, into a converter containing catalyst(s) for ammonia synthesis; (b) conveying the reaction mixture from said converter through a water-free adsorbent to effect adsorption of the formed ammonia together with some inert gases, whereby the adsorbed gases are separated from the unreacted mixture of gases, the latter being recycled to the converter; (c) effecting desorption of ammonia from the water-free ammonia-loaded adsorbent by direct contact of said adsorbent with a concentrated hot stream of ammonia-containing gases, and (d) condensing the ammonia eliberated from the adsorbent to liquid ammonia. The process has several advantages such as: reduced investments in equipment, substantial savings in mechanical energy, high yields of ammonia conversion per pass and less energy requirements per unit of ammonia produced.

15 Claims, 2 Drawing Figures

PROCESS FOR THE MANUFACTURE OF AMMONIA

This is a continuation in part of the application Ser. No. 403,137 filed on July 29, 1982 now abandoned.

The present invention relates to the manufacture of ammonia. More particularly the invention relates to an improved process for the manufacture of ammonia which saves appreciable amounts of energy.

The synthetic ammonia process is one of the most important industrial chemical processes now in operation. A most simple description of this process, was envisaged by the Haber process wherein ammonia was manufactured directly from the two elements hydrogen and nitrogen. This process was proved to be the most economical method discovered for the fixation of nitrogen.

The importance of the ammonia manufacture process from its elements, appears clearly from the very large number of patents and reviews on the process. The chemical reaction on which this process is based seems indeed to be simple:

$$N_2 + 3H_2 \rightleftarrows 2NH_3 + 24{,}000 \text{ cal.}$$

Inasmuch as the foregoing expression of equilibrium indicates that one volume of nitrogen and three volumes of hydrogen combine to form two volumes of ammonia, it follows according to Le Chatelier principle that the higher the pressure on the system the larger is the proportion of ammonia at equilibrium, or in other words the equilibrium is shifted towards the smaller volume. On the other hand, the higher the temperature the smaller will be the proportion of ammonia formed. Based on the correlation found between the ammonia formed at equilibrium and the effect of temperature and pressure, it was considered that an ideal ammonia process should be carried out at a temperature as low and at a pressure as high as may be practical and economical. This stipulation should be taken into account also in view of the rates of reaction towards equilibrium. Thus at ordinary temperatures the rate of reaction is virtually zero and is negligibly low even at 400° C. unless a catalyst is utilized. Obviously, the use of catalyst in ammonia synthesis is extremely important in permitting the reaction to be carried out at a lower temperature than would be practical with no catalyst. In commercial plants temperatures in the range of 400° to 550° C. are used.

The catalysts which are most widely used are based on iron plus small proportions of alumina, calcium, potassium, vanadium, rhutenium etc. Many patents can be found on improved catalysts or co-catalysts claiming to increase the yield and decrease the costs of ammonia production.

The decision on the pressure at which to carry out the ammonia synthesis is an economic factor, generally this pressure being in a range of 150 to 800 atmospheres.

The known process of ammonia synthesis involves four major steps. The first step comprises the preparation of nitrogen and hydrogen or a mixture of these two gases. Where natural gas is available at relatively low cost, this material is used as a source of hygrogen. Most of the plants, however, use air, steam and coke (or natural gas) to obtain a mixture of nitrogen and hydrogen along with carbon monoxide, carbon dioxide and other impurities. This mixture is then further processed with steam to convert most of the carbon monoxide to hydrogen and carbon dioxide. A few plants obtain hydrogen through the electrolysis of water, and a few others use coke-oven gas a source of hydrogen. In all plants the necessary nitrogen is obtained from air.

In the second step of the process, the gas mixture is compressed and then freed from undesired gases by means of an elaborate system of equipment, leaving a purified mixture of nitrogen and hydrogen in the correct proportion for the ammonia synthesis.

In the third major step the nitrogen-hydrogen mixture is passed through a bed of catalyst at a temperature around 500° C. and pressure from 150 to 1000 atmospheres. Some ammonia is thus formed, the proportion depending on the temperature and pressures used, the activity of the catalyst and time of contact of the gases with the catalyst.

In the fourth and final step the ammonia is removed, after a series of heat exchange operations, the bulk of the ammonia produced in the converter, being condensed and recovered at high pressure usually by refrigeration. The part of the gas mixture that remains uncombined, inerts and some ammonia, is recompressed and recycled through the catalyst to the conversion system after the addition of sufficient fresh nitrogen-hydrogen mixture to compensate for the ammonia removed from the system. Even with high-pressure operation, the per pass conversion of synthesis gas to ammonia is low so that it is necessary to return a large portion of the gas mixture to the converter. The fourth step has two major disadvantages:

(a) Heavy utilization of mechanical energy for the compression of the synthesis gas to the pressure of the synthesis for recirculation and for refrigeration.

(b) The inerts accumulated in the system constitute a burden reducing yield and they are removed mainly through purging, thus wasting valuable reactants in addition to the fact that they consume appreciable amounts of energy during the compression and refrigeration operations.

The literature is quite abundant with various patents describing a number of features which are claimed to improve the efficiency of ammonia synthesis per pass, or decreasing the energy to be utilized in a plant for ammonia manufacture. One approach described in these patents is based on the use of a special catalyst or co-catalyst. Another approach which can be distinguished in these patents, is based on various engineering improvements in the plant for ammonia manufacture. A typical example of such patents is the Japanese Patent application No. (54)060299, wherein the ammonia is recovered by water absorption with recycling of the unreacted gas after drying by solid adsorbent or with liquid aqueous ammonia. It is claimed that the energy required in this process is lower than in the usual processes. Still another approach which can be distinguished in the prior art references is the particular manner by which the unreacted gases are separated and recovered. A typical illustration of one of these patents is U.S. Pat. No. 4,180,553 wherein the hydrogen is recovered from ammonia purge gases, using a selective permeation membrane. Several theoretical papers can be found describing the influence of the inerts concentration on the efficiency of ammonia plant production. Thus in a paper which appears in Instrumentation Control System, Vol. 51, pages 23–26 (Feb. 2, 1978) it is concluded that one way to improve the ammonia plant efficiency of an existing plant is to operate the synthesis system at the highest possible inerts concentration. Nevertheless, inerts are a burden, requiring expensive energy, involving wasting raw materials that should be avoided, if possible.

The capacity of various adsorbent materials to adsorb ammonia is well known and documented in literature for many years. Also, the utilization of adsorptive separation to remove ammonia vapors from the unreacted constituents, the latter being recirculated to the converter in an ammonia synthesis loop has been mentioned in the past.

Thus, U.S. Pat. No. 1,319,663 describes the adsorption or absorption of ammonia formed from a mixture of nitrogen and hydrogen on various solid adsorbents or liquids. The ammonia is recovered by subjecting the loaded solid adsorbent or liquid to heat or reduced pressure. Although such proposal was done already in 1919, it is not practically utilized because it conceived the regeneration of the adsorbent and the recovery of the ammonia eliberated from it in a conventional manner, as described in said patent, that would be totally inapplicable in the context of ammonia synthesis. Firstly, it would have consumed a prohibitive amount of energy. Secondly, the recovered ammonia would have been extensively diluted with the non-adsorbed species which would be present in the adsorber vessel in significant quantity at the moment of regeneration because of the high pressure prevailing in the loop, thus hardly assisting the separation task as compared to direct cooling and condensatin from the converter effluent stream itself. Thirdly, it would have removed from the plant together with the adsorbed ammonia a very significant amount of valuable reactants thus losing more than one could ever gain by utilizing the adsorption separation.

According to U.S. Pat. No. 3,343,916, the separation of ammonia from the ammonia synthesis gases is carried out by absorption of the ammonia vapors in water, which allows a high degree of separation to be attained without recourse to extremely low temperatures. However, the detrimental effect of water as of any other oxygen containing compounds, on the ammonia synthesis catalyst, requires special precautions to be taken to absolutely avoid any entrainment of water vapors into the ammonia converter which will immediately poison the catalyst. Of course the process described in this patent completely differs from the separation method according to the present invention, wherein the desorption is done on a water-free ammonia-loaded adsorbent.

U.S. Pat. No. 3,702,525 describes the purification of purging gases from the ammonia process using an adsorbent bed. According to the process described therein, the regeneration of the ammonia-loaded adsorbent involves a pressure reduction, between the vessels. This reference does not mention anything in respect to a direct heat transfer during the regeneration of the loaded adsorbent and release of ammonia.

U.S. Pat. No. 4,077,u780 is related to the ammonia synthesis but also deals only with purge gases. The process described therein involves the selective adsorption of methane from the gaseous mixture using four adsorbent beds. The methane selective adsorption is based on the pressure reduction which is performed in the four beds.

U.S. Pat. No. 4,264,567 deals with the production of hydrogen to be utilized in the ammonia manufacture. The process does involve adsorption on solid beds but only related to obtain the purified hydrogen and not for desorption of ammonia-loaded adsorbent.

In spite of the above references, no record of adsorptive separation can be found in the abundant literature documenting ammonia manufacture practice. There is indeed good reasons for this fact. The presently known and established methods of operation of adsorption systems for the recovery of an adsorbable gas mixture component, may not be applied in the context of an ammonia synthesis loop for both technical and economic considerations. First, the utilization of a foreign regenerant constituent in a thermal swing cycle is not acceptable since it would contaminate the recirculated reactants and/or lead to an unbearable loss of valuable reactants. The application of a pressure swing cycle that would avoid such utilization of a foreign regenerant is also not acceptable since it would necessitate recompression of a large volume of recirculated gases. Therefore, any conventional application of adsorption within an ammonia synthesis loop, would cost several folds more than any achievable savings.

The above review of the prior art references, indicates that basically no improvement resulted in the ammonia manufacture process concerning energy consumption and simplicity of the process. Therefore it is an object of the present invention to provide an improvement in the ammonia manufacture process which saves appreciable amounts of energy compared with the known processes suggested by the prior art. Thus the invention consists in a process for the manufacture of ammonia, comprising the steps of (a) feeding a gaseous mixture of hydrogen and nitrogen, or generators thereof, in the proportions of about 3 moles hydrogen to 1 mole nitrogen, together with inert gases, into a converter containing known catalyst(s) for ammonia synthesis; (b) conveying the reaction mixture from said converter through a water-free adsorbent to effect adsorption of the formed ammonia together with some inert gases, whereby the adsorbed gases are separated from the unreacted mixture of gases, the latter being recycled to the converter; (c) effecting desorption of ammonia from the water-free ammonia-loaded adsorbent by direct contact of said adsorbent with a concentrated hot stream of ammonia-containing gases; and (d) condensing the ammonia eliberated from the adsorbent to liquid ammonia.

The most important feature of the invention is the step of separating the ammonia from the inert gases in a most convenient manner. As known, a main factor influencing the productivity of ammonia conversion concerns the presence of non-reacting chemical species (inerts), in the processed stream. Those enter the synthesis loop as constituents of the make-up synthesis gas that is continuously injected into the recirculated stream to make up for the reactants that have reacted. The inerts accumulate in the loop since they do not condense nor dissolve sufficiently in the liquid ammonia product that is removed continuously from the plant. Left alone, they would accumulate to constitute a major fraction of the processed stream and inhibit the reaction by reducing the effective partial pressure of the reactants and by adding a diffusional resistance the access of the reactants to the catalyst active sites and to the return of the ammonia product from the catalyst pores to the bulk of the processed stream.

The accumulation of inerts is usually prevented in one of two ways:

a. by purification of the synthesis gas prior to its being injected into the loop and
b. by purging continuously a fraction of the circulated gas.

The amount of gas removed from the loop as a purge and the amount of inerts present in the make-up synthesis gas determine the level of accumulation of inerts in the loop. The purging of gases from the synthesis loop contributes to the energy consumption per unit product very significantly since valuable reactants which have been generated, purified and compressed at considerable expenses, are thus discarded together with the inerts and are no longer available for conversion into ammonia. Even though several methods are available for the recovery of the reactants from the purged stream, this is costly and it is advantageous to minimize the amount of purge.

The separation of the ammonia formed in the converter from the unreacted gases is usually carried at a relatively low temperature which facilitates the separation. Most commonly, the converter effluent will be cooled to a temperature that will induce the condensation of ammonia allowing its separation by mechanical means such as free settling of the condensed droplets in a catch pot. When separation is effected by condensation, a high pressure is beneficial since it permits condensation at not too low a temperature thus saving the expenditures on refrigeration. Thus ammonia synthesis processes that are operated at a relatively low pressure require considerable refrigeration plants to achieve a reasonable degree of separation condensation. The cost of refrigeration increases very significantly as the target temperature is lowered severely, limiting the economics of separation by condensation beyond some limit.

A major feature of the present invention concerns the application of adsorptive separation to obtain substantial recovery of ammonia from the gases that are recirculated to the converter in a way that is consistent with both the conservation of valuable materials within the synthesis loop and with the utilization of energy potentials in the process and the recovery of heat that is being generated in the converter, in a most efficient way.

The effluents going out from the converter, are passed through a solid adsorbent bed, the adsorbent material having an adsorption power of at least 0.01 g ammonia per g adsorbent material at 30 degrees centigrade and preferably above 0.05 g ammonia ger g adsorbent material at the saturation pressure of ammonia in the converter effluent. Typical examples of such adsorbents materials are: charcoal, molecular sieves, zeolites, silica, alumina, active carbon, provided that their ammonia adsorption power is above the said mentioned value. Generally the separation step according to this embodiment will consist of two adsorption stages. In the first stage, the effluent gases from the converter, flow through an adsorbent bed, wherein most of the ammonia and a major fraction of the inert gases are retained on said bed while substantially ammonia-free adsorber effluent is recycled to the ammonia converter. When the adsorbing bed is nearing saturation, the converter effluent is conveyed to a fresh bed of adsorbent while the loaded bed is processed in the second stage of desorption for ammonia recovery and adsorbent conditioning for reuse. Generally this second stage of desorption will take one of two forms. In the first form, the hot converter effluents are conveyed through the ammonia-rich bed thereby releasing its ammonia content into the said stream which is thus further enriched with ammonia vapors. In the second form, this second stage of desorption will include the following operations:

(a) Displacement of the gas by a measured amount of pressurized liquid ammonia.

(b) Depressurization to ammonia condensation pressure (for example 20 atmospheres for condensation at ambient temperature), and then heating by recirculation of ammonia vapors through heat exchangers recovering heat from the synthesis system. Instead of heat exchangers it is possible to utilize the heat of the compressed hot ammonia vapors. This can be accomplished by circulating said ammonia vapors on its way from the refrigeration compressors to the ammonia condensers. The amount of heat is quite appreciable keeping in mind that for every 3 tons of circulated ammonia from the refrigeration plant, approximately one ton of adsorbed ammonia will be eliberated.

(c) Evacuation of ammonia vapors into the condensation system.

(d) Pressurization with fresh reactants gases and cooling by recirculation of the gases through a cooler.

As will be realized, more than one adsorbent bed might be utilized and sometimes might even be preferred in order to allow the various operation steps to be carried out on different beds simultaneously and to ensure steady and smooth operation of the synthesis system.

One of the advantages of the process according to the present invention is the fact that the process removes and utilizes in a most efficient way the heat of reaction resulting from the ammonia synthesis, in the stage of ammonia desorption from the adsorbent. This feature also contributes to the overall energetic savings of the process.

The temperature required in the process according to the present invention can be selected from a broad range, as generally selected in the normal ammonia synthesis. As known, the temperature should be just high enough to allow high activity of the reactants: nitrogen and hydrogen. Beyond a certain value, an increase in the temperature retards the reaction by favouring the decomposition of ammonia. On the other hand, up to a certain value, an increase in temperature will favour the reaction rate. Generally, the temperature range most suitable for the process according to the present invention will be in the range of 400° to 550° C. Of course the temperature selected will also depend on the pressure utilized in the system.

The pressure utilized in the ammonia synthesis is a well-known problem encountered in all prior art methods. It was considered in the conventional synthesis systems that high pressure operation is necessitated by a combination of techno-economic factors:

(a) Reaction equilibrium is favoured by high pressure while the rate and stability of the reaction with current commercial catalysts indicate a rather narrow range of operating temperature.

(b) The separation of the ammonia product by condensation is also favoured by high pressure while economics limit the degree of refrigeration.

(c) The reaction equilibrium and the degree of separation combine to determine a necessary "% conversion per pass" through the converter thereby influencing the necessary recirculation rate, equipment size and costs.

In the process according to the present invention, there is a clear advantage that lower pressures than in the conventional processes may be utilized, the higher pressures being not mandatory. This is a result of having eliminated the necessity of high pressure for ammonia separation from the unreacted gases thus widening the range of economical synthesis pressure options. Lower pressure will obviously be preferred. The condensation of concentrated ammonia vapors reduces substantially the energy consumption for refrigeration encountered in conventional processes. It was found that in the process according to the present invention, about 20% of the energy required for compression and refrigeration is saved compared with the conventional processes. In this respect it should be pointed out, that the compression and refrigeration operations constitute one of the major components in the overall costs of ammonia production as well as in its maintenance problems. In addition, inerts removal from the system by adsorption reduces significantly the required amount of purge, thereby improving the yield of product per unit of synthesis gas make up by as much as 10%.

The invention is based on the following observations:
(a) The amount of ammonia adsorbed per unit adsorbent material increases as a function of partial pressure of ammonia vapors in the fluid stream that is in contact with the adsorbent, and decreases as a function of the adsorbent temperature.
(b) Heat is most efficiently transferred to or from a bed of particles or a porous matrix of solid material by directly circulating through it the heating or the cooling fluid.
(c) At the conditions prevaling in the feed to the ammonia converter, an adsorbent bed or matrix that is initially sparsely loaded with ammonia will adsorb ammonia from a relatively cold stream even if the bed or matrix is initially hot and if the stream contains little ammonia. This, because the bed or matrix will be cooled by the stream sufficiently and because, due to the relatively high total pressure prevailing in the plant, even a small concentration of ammonia will correspond to a significant partial pressure of ammonia.
(d) An adsorbent bed or matrix that is initially cold and loaded with adsorbed ammonia, when brought in contact with a hot gas stream, will desorb and reject ammonia into the stream even if that stream consists of essentially pure ammonia vapors.
(e) A stream of gas that is contacted with a bed or matrix of solid adsorbent that is originally at a different temperature, will heat or cool it while being itself cooled or heated. This is known under the term of capacitative heat exchange.
(f) The ammonia reaction in the ammonia converter will not significantly occur unless the stream of reactants that is fed to the catalyst is sufficiently hot. On the other hand, recovery of the ammonia product from the stream that is coming out from the converter at an even higher temperature, because the reaction is exothermic, requires that this converter effluent be cooled prior to separation. This is why heat exchange between the streams entering and leaving the ammonia converter is always used but the balance of heat that was generated in the reaction may be a benefit or a burden depending on the temperature at which it is made.
(g) A high conversion per pass through the converter causes the generation of more heat per unit of gas recirculated, thus availing the heat at a temperature that is more easily usefully recovered.
(h) Large refrigeration plants that are often adjoined to ammonia plants can do and mostly do use an ammonia cycle that includes a hot stream of ammonia that must be cooled prior to ammonia condensation.
(i) The limited solubility of hydrogen and nitrogen in liquid ammonia makes it a suitable material to form a barrier and prevent the mixing of two gas streams such as the synthesis gas recirculated in the loop on the one hand, and a concentrated ammonia stream on the other.
(j) Most ammonia adsorbents will also adsorb, to a lesser extent, methane at a comparable conditions. However, since methane enters the synthesis loop at a rate that is at least one order of magnitude lower than the rate of formation of ammonia in the converter, a significant fraction of the methane may be removed by adsorption in parallel with the adsorption of ammonia.

The above observations have led to the present invention which involves, simply stated, recovering the ammonia from the adsorbent by direct contact of the adsorbent with a concentrated relatively hot stream of ammonia-containing gases.

The reactors required for the ammonia process according to the present invention are generally very similar to those utilized in the conventional processes. In its simplest form, such reactor consists of a pressure shell into which is fitted a cartridge comprising a catalyst zone and a heat exchanger. The reactor's cartridge is isolated and usually can be withdrawn from the pressure shell. The pressure shell is maintained below reaction temperature by allowing cold feed gas to flow through the annular space between the pressure shell and the cartridge into the interchanger. The interchanger preheats the gas to the required catalyst inlet temperature. The literature is quite abundant with various improvements in the reactor's design and theoretically any such improved reactor could be successfully utilized also in the process according to the present invention. In principle, the various types of ammonia converters which are in use today, can be divided into the two groups: Group (1), those using a single continuous catalyst bed which may or may not have heat transfer surfaces in the bed for controlling reaction heat; and group (2), those several catalyst beds with provision for removing and controlling heat between the beds. An improvement in the reactor's design in conjunction with the present invention, consists of replacing part or all of the interchanger, that would normally be included in the converter shell, by a pair of adsorbent beds. Through these beds would flow alternatingly the converter feed in one bed on its way to the catalyst, while the effluent going out from the catalyst section would flow through the second bed.

The catalysts required for the process according to the present invention are similar to those utilized in the conventional processes. Generally they consist of either natural or synthetic magnetite ($Fe_3O_4$) which has been triply promoted with oxides of potassium, aluminum and calcium. These promotors are added primarily for activity and stability purposes. As known, the catalyst becomes active only in the metallic form of pyrophoric iron. In the unreduced state both the unpromoted and promoted catalyst have the structure $FeO.Fe_2O_3$. Aluminum and calcium promotors take space in the crystal lattice as the spinel ($FeO.Al_2O_3$, etc.) and serve the purpose of increasing the effective area of the catalyst.

Addition of the potassium promotor increases the activity per unit area. Other substances reported to be present in some catalysts include silica, magnesium, sodium, titanium etc. The total content of all the iron oxides is on the order of 90% with the remainder as non-reducible oxides. As in the conventional processes, the catalyst loses activity in the course of its life primarily because of a change in its crystalline structure and exposure to excessive ooperating temperatures.

The entire process can be performed in any existent plant of ammonia production and this constitutes another advantage of the present invention. Of course the plant should first be adapted by the suitable provisions to separate from the effluent going out the converter, the ammonia generated, prior to its recirculation to the converter.

Comparing the process according to the present invention with those described in the prior art references which utilize solid adsorbents, as mentioned in the preamble of the specification, the following main differences can be noticed:

(a) In none of said references, the desorption of the ammonia from the ammonia-loaded adsorbent is done by the direct contact of said adsorbent with a concentrated hot stream of ammonia or ammonia-containing gases. This feature is very important since it imparts energetical savings concerning heat recovery.

(b) One of the main characteristics of the process is a total material conservation. As mentioned in the processes described in said prior art references, always some of the raw materials which do not react is expelled out from the system and thus lost. According to the present invention, no loss of raw materials does occur, the unreacted gases being recycled into the process. This characteristic does not exist in said known processes as described in the references mentioned above.

(c) The process is also characterized by its clear advantage of substantially full energy conservation. According to the process of the present invention the reaction heat between the reactants resulted in the converter, as well as the heat of desorption, are fully recovered and utilized in a most successfully manner. This feature, again, does not exist in said prior art processes wherein always energy from an outside source should be utilized and accordingly will increase the total operational costs.

The process according to the present invention is also very flexible and various modifications may be incorporated without derogating from the scope of the invention. Several embodiments can be envisaged for carrying out the process according to the present invention.

According to one embodiment, it is possible to operate the adsorbent-desorbent bed pair in a symmetrical configuration where the hot converter effluent gases flow through one bed thereby pushing out relatively concentrated ammonia vapors that were previously adsorbed through a cooler condenser, and then through the cold second bed wherein any non-condensed ammonia vapors are adsorbed. The ammonia-free top effluents of this second adsorbed, are recycled to the converter. Periodically, the roles of the two beds are reversed. This scheme is based on the observation that it is still possible to adsorb significant amounts of ammonia on a bed that it is initially relatively hot while feeding it with a cold stream. According to this embodiment, the process consists of three phases of operation:

(a) adsorption, (b) heating and desorption and (c) reconditioning.

In phase (a) the relatively hot adsorbent bed is installed just as before on the feed line to the converter thereby adsorbing ammonia from this stream.

In phase (b) the bed is fed with the hot effluent of the converter thereby heated rapidly to above 150° C. and releasing the ammonia that was adsorbed in phase (a) into the converter effluent stream which is thus enriched in ammonia.

In phase (c) the bed is reconditioned by displacing the ammonia-rich gas phase contained in its voids by an equal amount of (relatively) ammonia-free synthesis gas.

Basically, the adsorbent bed is utilized to transfer ammonia from a dilute cold stream (converter feed) to a concentrated hot stream (converter effluent). It is driven by the energy content of the hot stream itself which would otherwise constitute a cooling burden.

The process according to this embodiment requires about 0.33 m$^3$ of adsorbent bed per ton/day of ammonia recovered, based on cycles of operation of 30 minutes. Shorter cycles would reduce the bed volume requirement proportionally. Utilities consumption is practically negligible. The added pressure drop caused by the adsorbent bed around the system, is easily compensated by permissible reduction in recirculation rate while still obtaining the designed production.

According to a variation of the above embodiment, the desorption in phase (b) can be achieved by circulating the hot converter effluent through the bed, thereby heating said bed and consequently eliberating the ammonia that was adsorbed on it into the effluent stream. The periodic alternating of the two streams, the cold converter feed stream on one hand and the hot converter effluent on the other hand, through a pair of adsorbent beds, has thus a net effect of transfer of ammonia from the converter feed, with a consequence of reducing its ammonia content, to the converter effluent with a consequence of increasing its ammonia content. The net conversion per pass through the synthesis system is thus increased. At the same time, heat is transferred from the hot converter effluent to the converter feed stream, by means of the adsorbent bed. This heat transfer which accompanies the process according to the present invention, reduces or even avoids the necessity for the interchanger whose purpose is to preheat the feed gas to the required catalyst temperature.

According to another embodiment, the process involves a simultaneous removal of ammonia and methane from the gas recirculated to the converter. The separation in this case, consists of six phases carried out consecutively on six beds with the various flows redirected periodically such as to have one bed in each phase all the time while the process related to each of the phases is carried out continuously. In phase (1), the adsorbent bed is installed in the ammonia synthesis system immediately preceding the converter. The bed retains the ammonia and methane in the recycled stream thereby feeding the converter with practically pure synthesis gas including argon.

Phases (2) to (6) deal with ammonia recovery and reconditioning of the adsorbent bed for reuse. In phase (2), the bed which has just been disconnected from the system has its gas content pumped out back into the system while the void space of the bed is filled with liquid ammonia at the system's pressure. In phase (3), the liquid ammonia is pumped out into the bed being in phase 2 and its pressure is reduced to approx 20 atm. In phase (4), hot ammonia vapors (above 150° C.) are recirculated to the bed thereby warming it up rapidly to 150° C. and releasing most of the adsorbed vapors into the recirculated stream which is then directed to the ammonia condensers. This step requires about 3 tons of ammonia vapors to be recirculated per ton of ammonia thus separated. It will mostly be integrated with the refrigeration system that provides the necessary cooling for secondary separation, whereby the bed in phase (4) will be installed at the discharge of the refrigeration compressors. A large fraction of the heat would thus be provided from the refrigeration compressors, and therefore will proportionally reduce the load on the ammonia condensers. An additional heating of about 20°–30° C. may be provided by a steam-heated heater or a heat exchanger immediately preceding the adsorbent bed. In phase (5), the pressure in the bed is further reduced to about 1 atmosphere by connecting it to the suction of a refrigeration compressor. In phase (6), the bed pressure is raised to that of the system while being cooled to ambient temperature by recirculating the gas phase through a cooler. The necessary recirculation may be amply resulting by feeding the high pressure gas through an ejector.

The process according to this embodiment requires about 0.5 m$^3$ of adsorbent bed per ton/day of ammonia recovered based on cycles of operation of 40 minutes. Shorter cycles would reduce the bed volume requirement proportionally.

An important aspect of this embodiment is the removal of methane (which constitutes generally the larger part of the inerts) from the synthesis system. About 0.1 ton of methane can be removed with every ton of ammonia recovered. Since the make-up synthesis gas contains mostly less than 1% methane, removal of 10% of the total ammonia production or more by this recovery, allows for total removal of the methane from the system. Even though purging will still be necessary for the removal of Argon, the increased yield on raw materials resulting from the reduced purge is significant and can reach 5 to 6%, which is a significant improvement.

Summing up, the process according to the present invention is characterized by the following advantages compared with the known conventional process:

(a) Results in high yields of conversion of ammonia per pass.

(b) Reduces purge losses thereby making more ammonia per ton reactants.

(c) It requires reduced investments in equipment such as compressors and refrigeration units, pressure vessels and piping.

(d) Involves substantial savings in mechanical energy.

(e) Requires less energy imput per ton of ammonia produced.

(f) Opens up options for low pressure synthesis by reducing or potentially eliminating synthesis gas compression.

(g) It alleviates the generation of the proper reactants mixture in view of the methane removed.

Figure 2:
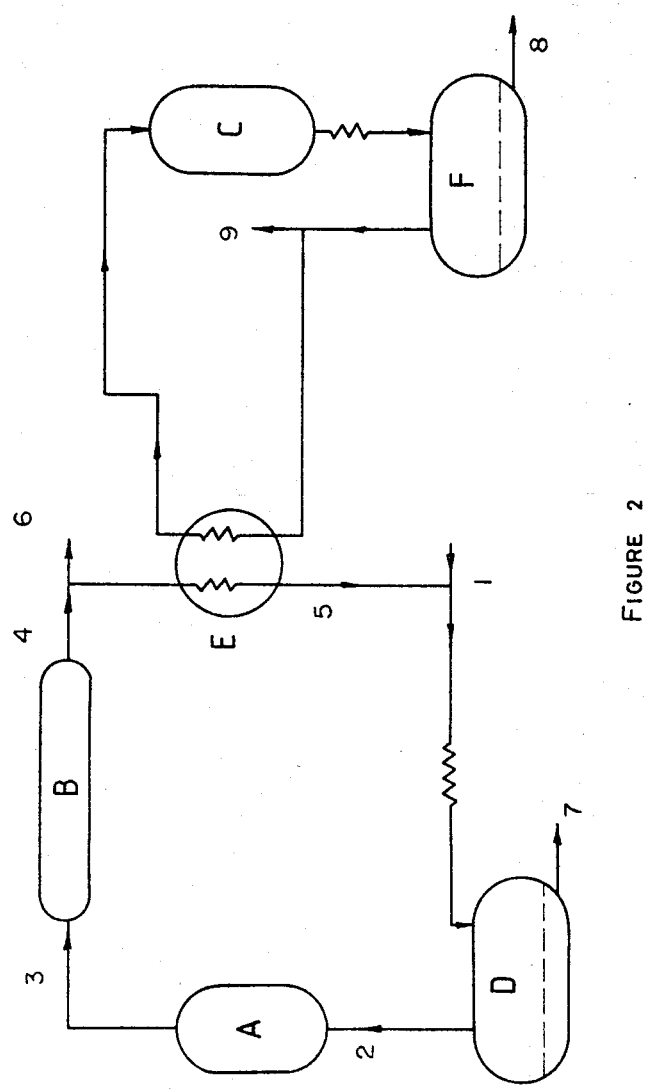

The invention will hereafter be illustrated in FIGS. 1 and 2, by schematic flow diagrams of the process for a better understanding of the invention's concept. It will be understood that it is not intended to limit the invention to these particular embodiments described and illustrated therein. On the contrary, it is intended to cover all alternatives, modifications and equivalents as may be included within the scope of the invention as defined by the appended claims. As shown in FIGS. 1 and 2 the process involves three distinct main steps:

(1) Synthesis gas preparation and synthesis of the ammonia.

(2) Removal of the ammonia formed from the effluent gases going out from the converter.

(3) Regeneration of the adsorbent bed and ammonia release.

Step (1) involves the preparation of the reactant gases and their mixing at the appropriate proportion (stream 1) followed by their reaction in the converter (Vessel B) in which they are conveyed. The known methods for providing the nitrogen and hydrogen reactants can be also utilized in the process according to the present invention.

Step (2) involves the conveying of the effluent gases going out from the converter (Vessel B) into vessel A (adsorbent bed) wherein the ammonia produced in the converter (vessel B) or fraction thereof is separated by adsorption onto an adsorbent bed (using particular reagents as specified in the specification) a small fraction of the unreacted nitrogen and hydrogen as well as the inert gases present therein, being released through purge (line 6).

Step (3) involves the regeneration of the adsorbent bed which occurs in vessel C, utilizing the heat generated in the ammonia formation (converter B).

The process will be now illustrated by the two Figures:

Following the schematic flow diagram in FIG. 1: The reactant gases are introduced into the synthesis system at the location marked as stream (1) where they mix with the relatively cold and ammonia-rich stream (5). This combined stream is further cooled, condensing and separating a substantial fraction of its ammonia content in vessel D and withdrawing the liquid ammonia product as stream 7. The cold ammonia-lean gas stream (2) exiting the separator (vessel D) is conveyed through the adsorbent (vessel A) thereby cooling the adsorbent contained therein which consequently retains most of the ammonia from stream 2. The hot and substantially ammonia-free adsorber effluent (stream 3) is conveyed through the converter (vessel B) in which the reactants are converted to ammonia. The hot, ammonia-rich converter effluent is conveyed, after purging a small fraction thereof (stream 6) to prevent the excessive accumulation of inert gases in the synthesis system, through the dessorber (vessel C) thereby heating the adsorbent contained therein which consequently releases ammonia that was adsorbed on it into the, relatively cold, dessorber effluent (stream 5). The roles of adsorber (vessel A) and of the dessorber (vessel B) are periodically reversed.

Following the schematic flow diagram in Figure 2: The process description of FIG. 1 applies equally to FIG. 2 from the introduction of the reactant gases in stream 1 and up to the extraction of the purge (stream 6) from the converter effluent (stream 4). However in the case of FIG. 2, the dessorption step is carried in a separate auxiliary ammonia circulation system, where hot ammonia vapors are circulated through the dessorber (vessel C) at relatively low pressure. The ammonia thus released from the adsorbent are condensed and separated in vessel F to a liquid ammonia product (stream 8). Non-condensable gases consisting mostly of methane that was adsorbed together with the ammonia in the previous step (in vessel A) are purged as stream 9 to prevent their accumulation in the auxiliary ammonia circulation system and to condition the adsorbent to take up additional amounts of methane from the main synthesis system (in vessel A). The auxiliary ammonia circulation system may be integrated into the ammonia cycle of the refrigeration plant that supplies the final cooling for the condensation of ammonia in the main synthesis system (vessel D), thus utilizing the heat envolved in the refrigeration compressors, in addition to that recovered in heat exchanger E to provide the necessary heat for the dessorption in vessel C.

Existing ammonia synthesis plants can mostly be retrofitted to incorporate the advantages of the process according to the present invention. Noting that most conventional ammonia synthesis systems can be schematically illustrated as in FIG. 1 without the vessels A and C, it is evident that suitable provisions may easily convert a conventional synthesis plant to that of the present invention. This may be further illustrated by several embodiments.

Retrofit embodiment (a).

Installation of an adsorber-dessorber pair (or several parallel pairs that would be operated in phased timing to smooth variations in the streams conditions), according to FIG. 1 in an existing synthesis plant would provide a significant increase in the conversion per pass, that would allow any combination of the following modification in operating conditions:
  (a) increase production capacity of the plant up to a maximum constrained by the available amount of reactants.
  (b) reduce recirculation rate around the synthesis systems thereby saving recompression and refrigeration energy.
  (c) conserve energy that would normally be dissipated to cooling air or water.
  (d) slightly reduce purge by virtue of the increased solubility of inerts in the larger fraction of liquid ammonia product that is extracted at a somewhat higher temperature.

Retrofit embodiment (b).

Same as retrofit embodiment a, except that the adsorber-dessorber pair is not implemented in separate external pressure vessels but in place of an existing heat exchanger within an existing enclosure such as the converter pressure shell itself.

Retrofit embodiment (c).

Installation of an adsorber desorber heat exchanger set (equipments A, C & E) according to FIG. 2 in an existing synthesis plant will provide both a significant increase in the conversion per pass and a significant decrease in purge through stream 6. This will allow:
  (a) an increase in production capacity of the plant to the extent of the prevented purge at no extra cost, plus an additional increase in capacity up to a maximum, constrained by the available amount of reactants.
  (b) energy saving in proportion to a reduction in the recirculation rate around the synthesis systems, mainly due to reduced recompression and refrigeration loads.

The invention will furthermore be described by the following Examples, which include preferred embodiments, presented in order to illustrate the practice of the process. It should be understood that the particulars described are by way of example and for purpose of illustrative discussion of preferred embodiments of the present invention and are presented in the cause of providing what is believed to be the most useful and readily understood description of procedures as well as of the principles and conceptual aspects of the invention. In the Examples given below, the percentages mentioned are by volume (unless otherwise stated) being expressed at normal pressure and normal temperature.

EXAMPLE 1

A gaseous feed stream consisting of 251 cc/min nitrogen, 754 cc/min hydrogen, 10 cc/min methane and 8 cc/min argon, were introduced in the synthesis system described in FIG. 2, at point 1. The mixture of this gaseous stream with the converter effluent (5) was circulated through the adsorber (vessel A) containing 120 grams of granular activated carbon at 35° C. and 150 atmospheres, yielding an adsorber effluent stream consisting of 1045 cc/min nitrogen, 3135 cc/min hydrogen, 322 cc/min methane, 342 cc/min argon and 39 cc/min ammonia. From this stream, 10 cc/min were purged to maintain a constant pressure of 150 atmospheres in the system, while the rest was fed to the converter (vessel B) containing 30 cc of double promoted iron catalyst for ammonia synthesis, maintained at a temperature of 450° C. and pressure of 150 atmospheres. The converter effluent (stream 4) consisted of 798 cc/min nitrogen, 2394 cc/min hydrogen, 530 cc/min ammonia, 322 cc/min methane and 342 cc/min argon.

Thirty minutes after having installed on stream a freshly regenerated and pressurized with synthesis gas at 150 atmospheres adsorber (vessel A), it was isolated, removed and replaced by another fresh adsorber. The removed bed was subjected to a regeneration procedure as follows:
  (a) The gas phase in the bed was displaced by means of 250 cc of liquid ammonia at 35° C. and 150 atmospheres, releasing an equal volume consisting of 3294 cc nitrogen, 9900 cc hydrogen, 2178 cc ammonia, 1294 cc methane and 1334 cc argon, which was recycled into the synthesis system at the point of feed introduction (point 1). (b) The liquid ammonia was then drained and the bed was depressurized down to atmospheric pressure, while being heated to 150 degrees centigrade by direct contact with the hot stream of ammonia vapors releasing 32780 cc ammonia, 110 cc nitrogen, 330 cc hydrogen, 288 cc methane and 78 cc argon.

The released vapors were condensed at 20 temperatures and 30 degrees centigrade, yielding 23.1 g of liquid ammonia plus a purge stream (9) consisting of 1653 cc ammonia, 108 cc nitrogen, 37 cc hydrogen, 278 cc methane and 76 cc argon, from which one additional gram of liquid ammonia could further be recovered by refrigeration.

EXAMPLE 2

A gaseous feed stream consisting of 256 cc/min of nitrogen, 767 cc/min hydrogen, 10 cc/min methane and 3 cc/min argon, was fed into the synthesis system described in FIG. 2 at point (1). The mixture of this gaseous stream with the converter effluent (5) was circulated through the adsorber (vessel A) containing 120 grams of granular activated carbon at 35 degrees centigrade and 100 atmospheres, yielding an adsorber effluent stream consisting of 1386 cc/min nitrogen, 4158 cc/min hydrogen, 599 cc/min methane, 299/min argon and 52 cc/min ammonia. From this stream, 35 cc/min were purged to maintain a constant pressure of 100 atmospheres in the system, while the rest was fed to the converter (vessel B) containing 30 cc of double promoted iron catalyst for ammonia synthesis, maintained at a temperature of 450 degrees centigrade and pressure of 100 atmospheres. The converter effluent (4) consisted of 1133 cc/min nitrogen, 3399 cc/min hydrogen, 543 cc/min ammonia, 596 cc/min methane and 298 cc/min argon.

Thirty minutes after having installed on stream a freshly regenerated and pressurized with synthesis gas at 100 atmospheres adsorber (vessel A), it was isolated, removed and replaced by another fresh adsorber. The removed bed was subjected to a regeneration procedure as follows:

(a) The gas phase in the bed was displaced by means of 250 cc of liquid ammonia at 35 degrees centigrade and 100 atmospheres, releasing an equal volume consisting of 2280 cc nitrogen, 6852 cc hydrogen, 1092 cc ammonia, 1184 cc methane and 592 cc argon into the synthesis system at the point of feed introduction (1).

(b) The liquid ammonia was then drained and the bed was depressurized down to atmospheric pressure while being heated to 150 degrees centigrade by direct contact with the hot stream of ammonia vapors releasing 26690 cc ammonia, 75 cc nitrogen, 226 cc hydrogen, 216 cc methane and 52 cc argon.

The released vapors were condensed at 20 atmospheres and 30 degrees centigrade yielding 19 g liquid ammonia plus a purge stream (9) consisting of 1653 cc ammonia, 73.5 cc nitrogen, 222 cc hydrogen, 207 cc methane and 50 cc argon, from which one additional gram of liquid ammonia could further be recovered by refrigeration.

EXAMPLE 3

A gaseous feed stream consisting of 246 cc/min nitrogen, 737 cc/min hydrogen, 13 cc/min methane and 4 cc/min argon, was introduced in the synthesis system described in FIG. 1 at point 1 where it mixed with the effluent of the dessorber (vessel C). This mixture was cooled to 0 degrees centigrade separating some liquid ammonia in vessel D. The gaseous effluent (2) of the separator D, consisted of 1008 cc/min nitrogen, 3003 cc/min hydrogen, 207 cc/min ammonia, 493 cc/min methane and 145 cc/min argon. This gaseous effluent was fed to the adsorber (vessel A), which contained initially 21.6 g of granulated active carbon, 558 cc nitrogen, 1662 cc hydrogen, 348 cc ammonia, 327 cc methane and 105 cc argon, all at 150 atmospheres and an average temperture of about 245 degrees centigrade.

The gaseous effluent of the adsorber (stream 3) having an average temperature of 140° C. and consisting on the average of 1008 cc/min nitrogen, 3003 cc/min hydrogen, 33 cc/min ammonia, 455 cc/min methane and 145 cc/min argon, was fed to the converter (vessel B), containing 20 cc of doubly promoted iron catalyst for ammonia synthesis, maintained at temperature of 450° C. and 150 atmospheres. The converter effluent (stream 4) consisted of 781 cc/min nitrogen, 2321 cc/min hydrogen, 488 cc/min ammonia, 455 cc/min methane and 145 cc/min argon. A portion of this stream amounting to 101 cc/min was purged (stream 6) to maintain a constant pressure of 150 atmospheres in the system while the rest was fed at a temperature of 250° C. to the dessorber (vessel C). Said dessorber contained initially 21.6 grams of active carbon, 1157 cc nitrogen, 3454 cc hydrogen, 1975 cc ammonia, 608 cc methane and 167 argon, all at 150 atmospheres and an average temperature of 5° C. The dessorber effluent (stream 5) consisted on the average of 762 cc/min nitrogen, 2265 cc/min hydrogen, 650 cc/min ammonia, 482 cc/min methane and 142 cc/min argon. The liquid ammonia separated from this dessorber effluent (stream 5), after mixing with the feed and cooling to a temperature of 0° C. amounted to 3.4 grams ammonia in 10 minutes.

EXAMPLE 4

A gaseous feed stream consisting of 492 cc/min nitrogen, 1484 cc/min hydrogen, 26 cc/min methane and 8 cc/min argon, was introduced in the synthesis system described in FIG. 1 at point 1 where it mixed with the effluent of the dessorber (stream 5). This mixture was cooled to 35° C. separating some liquid ammonia in vessel D. The gaseous effluent (2) of the separator D, consisted of 1192 cc/min nitrogen, 3568 cc/min hydrogen, 460 cc/min ammonia, 670 cc/min methane and 264 cc/min argon. This gaseous effluent was fed to the adsorber (vessel A), which contained initially 23 grams of granulated active carbon, 952 cc nitrogen, 2850 cc hydrogen, 1262 cc ammonia, 732 cc methane and 134 cc argon, all at 390 atmospheres and an average temperature of 440° C.

The gaseous effluent of the adsorber (stream 3) having an average temperature of 300° C. and consisting on the average of 1192 cc/min nitrogen, 3568 cc/min hydrogen, 156 cc/min ammonia, 634 cc/min methaneand 264 cc/min argon was fed to the converter (vessel B), containing 20 cc of doubly promoted iron catalyst for ammonia synthesis, maintained at a temperature of 450° C. and a pressure of 390 atmospheres. The converter effluent (stream 4) consisted of 824 cc/min nitrogen, 2470 cc/min hydrogen, 1094 cc/min ammonia, 634 cc/min methane and 264 cc/min argon. A portion of this stream amounting to 132 cc/min, was purged (stream 6) to maintain a constant pressure of 390 atmospheres in the system while the rest was fed at a temperature of 450° C. to the dessorber (vessel C) containing initially 23 grams of active carbon, 2766 cc nitrogen, 8282 cc hydrogen, 4114 cc ammonia, 1908 cc methane and 616 cc argon, all at 390 atmospheres and at an average temperaure of 50° C.

The dessorber effluent (stream 5) consisted on the average of 804 cc/min nitrogen, 2408 cc/min hydrogen, 1370 cc/min ammonia, 686 cc/min methane and 258 cc/min argon. The liquid ammonia separated from this dessorber effluent (stream 5), after mixing with the feed and cooling to a temperature of about 35° C., amounted to 7 g ammonia in 10 minutes.

EXAMPLE 5

A gaseous feed stream consisting of 250 cc/min nitrogen, 747 cc/min hydrogen, 13 cc/min methane and 5 cc/min argon, was introduced in the synthesis system described in FIG. 2, at point 1. The mixture of this gaseous stream with the converter effluent (5), cooled at 0° C. condensing and separating in vessel D some liquid ammonia (stream 7). The remaining gas (stream 2) was circulated through the adsorber (vessel A) containing 24 grams of dehydrated calcium-aluminum silicate (zeolite Ca-X) at 35° C. and 150 atmospheres, yielding an adsorber effluent stream consisting of 1021 cc/min nitrogen, 3047 cc/min hydrogen, 669 cc/min argon and 10 cc/min ammonia. This stream (3) was fed to the converter (vessel B) containing 20 cc of double promoted iron catalyst for ammonia synthesis, maintained at a temperature of 450 degrees centigrade and a pressure of 150 atmospheres. The converter effluent (stream 4) consisted of 777 cc/min nitrogen, 2315 cc/min hydrogen, 497 cc/min ammonia and 669 cc/min argon. From this stream, 25 cc/min wwere purged (stream 6) to maintain a constant pressure of 150 atmospheres in the system, while the rest (stream 5) was mixed with the make-up gas (1) cooled to zero degree centigrade, separating and accummulating within 60 minutes an amount of 13 g of liquid ammonia (stream 7).

Ten minutes after having installed on stream a freshly regenerated and pressurized with synthesis gas at 150 atmospheres adsorber (vessel A), it was isolated, removed and replaced by another fresh adsorber. The removed bed was subjected to a regeneration procedure as follows:
(a) The gas phase in the bed was displaced by means of 50 cc of liquid ammonia at 0 degrees centigrade and 150 atmospheres, releasing an equal volume consisting of 1545 cc nitrogen, 4612 cc hydrogen, 315 cc ammonia, 15 cc methane and 1013 cc argon, which was recycled into the synthesis system at the point of feed introduction (point 1).
(b) The liquid ammonia was then drained and the bed was then depressurized down to atmospheric pressure, while being heated by direct contact with the hot stream of ammonia vapors to 150 degrees centigrade releasing 6190 cc ammonia, 15 cc nitrogen, 45 cc hydrogen, 130 cc methane and 9 cc argon.

The released vapors were condensed at 20 atmospheres and 30 degrees centigrade, yielding 4.3 g of liquid ammonia plus a purge stream (9) consisting of 600 cc ammonia, 15 cc nitrogen, 45 cc hydrogen, 130 cc methane and 9 cc argon, from which additional 0.2 gram of liquid ammonia could further be recovered by refrigeration.

EXAMPLE 6

A gaseous feed stream consisting of 250 cc/min of nitrogen, 747 cc/min hydrogen, 13 cc/min methane and 5 cc/min argon, was fed into the synthesis system described in FIG. 2 at point (1). The mixture of this gaseous stream with the converter effluent (5) was cooled to 0° C. condensing and separating in vessel D some liquid ammonia (stream 7). The remaining gas (stream 2) was circulated through the adsorber (vessel A) containing 39 grams of dehydrated calcium-aluminum silicate (zeolite Ca-X) at 35° C. and 100 atmospheres, yielding an adsorber effluent stream consisting of 1583 cc/min nitrogen, 4740 cc/min hydrogen, 1063 cc/min argon and 151 cc/min ammonia. This stream (3) was fed to the converter (vessel B) containing 30 cc of double promoted iron catalyst for ammonia synthesis, maintained at a temperature of 450° C. and 100 atmospheres pressure. The converter effluent (4) consisted of 1340 cc/min nitrogen, 4015 cc/min hydrogen, 635 cc/min ammonia, and 1063 cc/min argon. From this stream, 26 cc/min were purged (stream 6) to maintain a constant pressure of 100 atmospheres in the system, while the rest (stream 5) was mixed with the make-up gas (1), cooled to 0° C., separating and accumulating within 60 minutes an amount of 7.3 g of liquid ammonia (stream 7).

Ten minutes after having installed on stream a freshly regenerated and pressurized with synthesis gas at 100 atmospheres adsorber (vessel A), it was isolated, removed and replaced by another fresh adsorber. The removed bed was subjected to a regeneration procedure as follows:
(a) The gas phase in the bed was displaced by means of 82 cc of liquid ammonia at 0° C. and 100 atmospheres releasing an equal volume consisting of 1649 cc nitrogen, 4937 cc hydrogen, 492 cc ammonia, 16 cc methane and 1107 cc argon into the synthesis system at the point of feed introduction (1).
(b) The liquid ammonia was then drained and the bed was depressurized down to atmospheric pressure while being heated to 150° C. releasing 9942 cc ammonia, 17 cc nitrogen, 50 cc hydrogen, 130 cc methane and 11 cc argon.

The released vapors were condensed at 20 atmospheres and 30° C. yielding 7.1 g liquid ammonia plus a purge stream (9) consisting of 620 cc ammonia, 17 cc nitrogen, 50 cc hydrogen, 130 cc methane and 11 cc argon, from which additional 0.2 gram of liquid ammonia could further be recovered by refrigeration.

It will be evident to those skilled in the art that the invention is not limited to the details of the foregoing illustrative embodiments and examples and that the present invention may be embodied in other specific forms without departing from the essential attributes thereof, and it is therefore desired that the present examp es be considered in all respects as illustrative and not restrictive, reference being made to the appended claims, rather than the foregoing description, and all changes which come with the meaning and range of equivalency of the claims are therefore intended to be embraced therein.

I claim:
1. A process for the manufacture of ammonia, comprising the steps of
(a) feeding a gaseous mixture of hydrogen and nitrogen, or generators thereof in the proportions of about 3 moles hydrogen to 1 mole nitrogen, together with inert gases, into a converter containing catalyst(s) for ammonia synthesis and thereby producing ammonia;
(b) conveying the reaction mixture from said converter through an adsorbent to effect adsorption of the formed ammonia together with some inert gases, whereby the adsorbed gases are separated from the unreacted mixture of gases, the latter being recycled to the converter;
(c) effecting desorption of ammonia from the ammonia-loaded adsorbent by direct contact of said adsorbent with a concentrated hot stream of ammonia-containing gases comprising the hot effluent from the converter;
(d) condensing the ammonia eliberated from the adsorbent to liquid ammonia; and
wherein the adsorption and desorption steps are carried out in phased order, providing continuous streams of controlled compositions.

2. A process according to claim 1, wherein two or more adsorbent beds are utilized to carry out, in parallel, said adsorption and desorption steps in said phased order, providing said continuous streams of controlled compositions.

3. A process according to claim 1, wherein heat is transferred from the hot regenerant stream to the adsorbent bed to be regenerated and subsequently heat is transferred from the adsorbent bed to the unreacted mixture of gases recycled into the converter.

4. A process according to claim 1, wherein the adsorbent bed separates simultaneously the ammonia and methane from the gas recycled to the converter.

5. A process according to claim 4, wherein the gases going out from the adsorbent bed and entering into the converter, comprises substantially pure synthesis gas including argon.

6. A process according to claim 1, carried out in an existing ammonia plant wherein solid adsorption beds are incorporated therein.

7. A process according to claim 1 wherein said desorption is carried out at substantially the same pressure as said adsorption.

8. A process for the manufacture of ammonia, comprising the steps of
  (a) feeding a gaseous mixture of hydrogen and nitrogen, or generators thereof in the proportions of about 3 moles hydrogen to 1 mole nitrogen, together with inert gases, into a converter containing catalyst(s) for ammonia synthesis and thereby producing ammonia;
  (b) conveying the reaction mixture from said converter through an adsorbent to effect adsorption of the formed ammonia together with some inert gases, whereby the adsorbed gases are separated from the unreacted mixture of gases, the latter being recycled to the converter;
  (c) effecting desorption of ammonia from the ammonia-loaded adsorbent by direct contact of said adsorbent with a concentrated hot stream of ammonia-containing gases comprising hot compressed ammonia refrigerant which is at least as concentrated with ammonia as the hot effluent from the converter;
  (d) condensing the ammonia eliberated from the adsorbent to liquid ammonia; and
  wherein the adsorption and desorption steps are carried out in phased order, providing continuous streams of controlled compositions.

9. A process according to claim 8, wherein a liquid ammonia barrier is used to separate the circulated reactant mixture of gases from the ammonia refrigerant gas, thus substantially eliminating losses of unreacted gases into the refrigeration cycle.

10. A process according to claim 8, wherein two or more adsorbent beds are utilized to carry out, in parallel, said adsorption and desorption steps in said phased order, providing said continuous streams of controlled compositions.

11. A process according to claim 8, wherein heat is transferred from the hot regenerant stream to the adsorbent bed to be regenerated and subsequently heat is transferred from the adsorbent bed to the unreacted mixture of gases recycled into the converter.

12. A process according to claim 8, wherein the adsorbent bed separates simultaneously the ammonia and methane from the gas recycled to the converter.

13. A process according to claim 12, wherein the gases going out from the adsorbent bed and entering into the converter, comprises substantially pure synthesis gas including argon.

14. A process according to claim 8, carried out in an existing ammonia plant wherein solid adsorption beds are incorporated therein.

15. A process according to claim 8 wherein said desorption is carried out at substantially the same pressure as said adsorption.

* * * * *